United States Patent
Jayachandran (12)

(10) Patent No.: US 11,463,502 B2
(45) Date of Patent: Oct. 4, 2022

(54) SYSTEMS AND METHODS ENHANCING STREAMING VIDEO PERFORMANCE THROUGH COLOR DEPTH VARIANCE

(71) Applicant: SLING MEDIA PVT LTD, Bangaluru (IN)

(72) Inventor: Arjun Jayachandran, Bengaluru (IN)

(73) Assignee: Sling Media Pvt. Ltd., Bengaluru (IN)

( * ) Notice: Subject to any disclaimer, the term of this patent is extended or adjusted under 35 U.S.C. 154(b) by 39 days.

(21) Appl. No.: 17/093,103

(22) Filed: Nov. 9, 2020

(65) Prior Publication Data

US 2021/0058443 A1    Feb. 25, 2021

Related U.S. Application Data

(63) Continuation of application No. 16/554,341, filed on Aug. 28, 2019, now Pat. No. 10,862,947, which is a continuation of application No. 15/705,556, filed on Sep. 15, 2017, now Pat. No. 10,440,088.

(51) Int. Cl.

| | |
|---|---|
| H04L 65/80 | (2022.01) |
| H04L 65/1069 | (2022.01) |
| H04L 65/70 | (2022.01) |
| H04L 65/75 | (2022.01) |
| H04L 65/613 | (2022.01) |
| H04L 67/01 | (2022.01) |

(52) U.S. Cl.
CPC .......... *H04L 65/80* (2013.01); *H04L 65/1069* (2013.01); *H04L 65/613* (2022.05); *H04L 65/70* (2022.05); *H04L 65/75* (2022.05); *H04L 65/762* (2022.05); *H04L 67/01* (2022.05)

(58) Field of Classification Search
CPC . H04L 65/80; H04L 65/1069; H04L 65/4092; H04L 65/601; H04L 65/602; H04L 65/607; H04L 67/42; H04L 65/70; H04L 65/762; H04L 65/613; H04L 65/75; H04L 67/01
See application file for complete search history.

(56) References Cited

U.S. PATENT DOCUMENTS

| | | | |
|---|---|---|---|
| 9,942,294 B1* | 4/2018 | Jose Chiriyankandath | ................. H04L 67/32 |
| 2007/0024706 A1* | 2/2007 | Brannon, Jr. | ...... H04N 21/6587 348/E7.071 |
| 2013/0152153 A1* | 6/2013 | Weiser | .................. H04L 65/105 726/1 |

* cited by examiner

*Primary Examiner* — Kristie D Shingles
(74) *Attorney, Agent, or Firm* — KW Law, LLP (57) ABSTRACT

Systems and methods are provided for enhancing streaming performance through controlled and selectively-applied reductions in the color depth of streamed video content. In various embodiments, the method includes receiving, at a streaming media server, a request transmitted over a communications network to stream video content to a client media receiver. In response to this request, a streaming video session is initiated between the client media receiver and the streaming media server. During the streaming video session, the streaming media server obtains the video content as video input data having an original color depth; generates an encoded video stream from the video input data, while selectively reducing a color depth of the encoded video stream; and transmits the encoded video stream over the communications network to the client media receiver. The streaming media server repeats the steps of generating and transmitting until termination of the streaming video session.

17 Claims, 3 Drawing Sheets

SYSTEMS AND METHODS ENHANCING STREAMING VIDEO PERFORMANCE THROUGH COLOR DEPTH VARIANCE

CROSS REFERENCE TO RELATED APPLICATIONS

The application is a continuation of U.S. patent application Ser. No. 16/554,341 filed on Aug. 28, 2019 which is a continuation of the parent U.S. patent application Ser. No. 15/705,556 (issued U.S. Pat. No. 10,440,088) filed on Sep. 15, 2017, both of which are incorporated herein by reference.

TECHNICAL FIELD

The following generally relates to streaming media, and, more particularly, to systems and methods enhancing streaming performance through controlled reductions in the color depth of streaming video content.

ABBREVIATIONS

The following abbreviations appear throughout this document:
CDN—Content Delivery Network;
DVI—Digital Video Interface;
DVR—Digital Video Recorder;
HDMI—High Definition Multimedia Interface;
I/O—Input/Output;
LAN—Local Area Network;
OTT—Over-The-Top;
SPFID—Sony/Philips Display Interface Format;
STB—Set-Top Box;
VOD—Video On Demand;
VPN—Virtual Private Network; and
WAN—Wide Area Network.

BACKGROUND

Media streaming services enhance the ease and convenience with which end users view streaming video content, such as VOD, OTT television content, and placeshifted content. Media streaming services are, however, inherently limited by resource constraints affecting network reliability and bandwidth availability. When network bandwidth becomes undesirably constrained during a streaming video session, latencies may occur resulting in prolonged buffering and other delays in the presentation of streaming video content. Network latencies can also result in sluggish response times in implementing user-issued commands during a streaming video session, such as channel change commands issued when streaming OTT television content. Adaptive streaming techniques have thus been developed and are now widely employed to enhance streaming media performance despite network bandwidth variances.

While useful in improving streaming video performance under constrained bandwidth conditions, conventional adaptive streaming techniques remain limited in certain respects. By their nature, conventional adaptive streaming techniques leverage controlled degradations to image resolutions and video frame rate to bring about desired reductions in streaming bitrate. Depending upon their severity at any given point in time, such degradations to streaming frame rate and to image resolution can become highly noticeable and distracting to end users. Consequently, the application of conventional adaptive streaming techniques can detract from the viewing experience of an end user in at least some instances. There consequently exists an ongoing need for enhanced streaming techniques through which controlled reductions to streaming bitrate can be achieved with a decreased reliance on degradations to streaming video frame rate and image resolution. Embodiments of such enhanced adaptive streaming techniques are set-forth herein, as are systems suitable for implementing enhanced adaptive streaming techniques.

BRIEF SUMMARY

Methods are provided for enhancing streaming video performance through controlled reductions in the color depth of streaming video content. In various embodiments, the method includes receiving, at a streaming media server, a request transmitted over a communications network to stream video content to a client media receiver. In response to receipt of this request, a streaming video session is initiated between the client media receiver and the streaming media server. During the ensuing streaming video session, the streaming media server obtains the video content as video input data having an original color depth; generates an encoded video stream from the video input data, while selectively reducing a color depth of the encoded video stream relative to the original color depth; and transmits the encoded video stream over the communications network to the client media receiver. The streaming media server repeats the steps of generating and transmitting until termination of the streaming video session.

In another embodiment, the method includes the step or process of obtaining, at a streaming media server, video content as video input data having an original (native or nondegraded) color depth and an original (native or nondegraded) image resolution. The streaming media server generates a plurality of video streams of varying bandwidths from the video input data. The plurality of video streams include a high bandwidth media stream containing the video content encoded at the original color depth and the original image resolution, an intermediate bandwidth media stream containing the video content encoded at a reduced color depth (relative to the original color depth) and the original image resolution, and a low bandwidth media stream containing the video input data encoded at the reduced color depth color depth and a reduced image resolution (relative to the original image resolution). The streaming media server then transmits the media streams to the client media receiver over the communications network or otherwise avails the receiver of the media streams (e.g., by uploading the media streams to a cloud-based storage service) to enable presentation of the video content on a display device associated with the client media receiver.

Further disclosed are embodiments of a streaming media server, which is configured to selectively reduce the color depth of streaming video content. In an embodiment, the streaming media server includes a processor and a computer-readable storage medium, which stores a computer-executable code. When executed by the processor, the computer-executable code causes the streaming media server to perform the operations of: (i) when receiving a request from the client media receiver for streaming transmission of video content, obtaining the video content as video input data having an original color depth; (ii) generating an encoded video stream from the video input data, while selectively reducing a color depth of the encoded video stream relative to the original color depth; (iii) transmitting the encoded video stream over the communications network to the client media receiver; and (iv) repeating the steps of generating and transmitting until termination of the streaming video session.

The foregoing methods and variants thereof can also be implemented through software or program products bearing computer-readable instructions. Various additional examples, aspects, and other features of embodiments of the present disclosure are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Overview

Methods and systems are provided for enhancing streaming video performance through controlled reductions in the color depth or quality of streaming video content. Generally stated, such methods are carried-out by a streaming media server, which generates an encoded video stream having a variable color depth and, perhaps, other variable parameters. Under specified conditions, the streaming media server varies the color depth of the encoded video stream by selectively reduces or shallows the color depth of video data input during or upstream of the encoding process. The streaming media server generates the encoded video stream, in part, by obtaining desired video content as video input data having an original (native or nondegraded) color depth and other original attributes, such as an original image resolution. Reductions in color depth of the encoded video stream are therefore realized by diminishing or shallowing the color depth of the encoded video stream as compared to the original color depth of the video input data. The encoded video stream is considered to have a reduced or shallowed color depth when the number of bits utilized to represent color information (considered per pixel or per group of pixels) is reduced in at least some, if not all of the video image frames contained in the streamed video content. In this manner, color depth shallowing can be selectively applied by the streaming media server to reduce streaming bitrate and thereby improve various measures of streaming video performance, as discussed more fully below.

The streaming media server can generate the encoded video stream to have a reduced color depth under any specified circumstance or set of circumstances. For example, in certain instances, the streaming media server may automatically (that is, without requiring additional input from an end user and, perhaps, independently of network bandwidth conditions) apply color depth reduction during an initial "quick start" phase of a streaming video session. Such an approach may be particularly useful when, for example, the streaming media server functions as a consumer placeshifting device and, perhaps, is located within the residence of the end user. In other instances, the streaming media server may apply color depth reduction to one or more streaming channels included in an OTT television channel bundle to reduce the overall bitrate or packet size of the streamed channel bundle. For example, the streaming media server may determine whether a particular channel included in the OTT channel bundle is currently being viewed by an end user, and transmit that channel in an original color depth, while concurrently transmitting one or more of the other streaming channels at reduced color depths. As a still further possibility, the streaming media server may monitor one or more parameters pertaining to the communications network, such as current network bandwidth, and vary the color depth of the encoded video stream in response to changes in the monitored parameter(s).

In certain implementations, color depth reduction can be employed as a standalone solution to bring about desired decreases in streaming bitrate. In many cases, however, color depth reduction will be selectively applied in conjunction with selective or conditional degradations to other attributes of the encoded video stream affecting streaming bitrate under certain conditions. More specifically, controlled degradations to streaming video frame rate and/or image resolution may be applied in concert with color depth reduction in at least some instances. When this is the case, a prioritization scheme or hierarchy may be employed such that color depth reduction is applied preferentially over degradations to frame rate and image resolution. For example, when only modest reductions in streaming bitrate are desired or required, the streaming media server may apply at color depth reduction to the encoded video stream, without accompanying degradations to frame rate and image resolution. If, instead, more drastic reductions in streaming bitrate are desired, the streaming media server may encode the video stream at reduced color depths, as well as a degraded image resolution and/or video frame rate. Other embodiments may employ hierarchies of varying complexities, such that differing levels of color depth reduction may be applied in isolation or in conjunction with degradations to video frame rate and/or image resolution, generally with color depth reduction preferentially applied and, perhaps, increasing in severity as increasingly lower streaming bitrates or packet sizes are desired.

Various different techniques can be employed for bring about desired reductions in color depth. Such techniques can include the usage of restricted color palettes in the generation of encoded video stream, reduction in color resolution of the encoded video stream (as compared to the original color resolution of video data input), the stripping of chroma information from the encoded video stream, and other approaches, as discussed in detail below. Regardless of the particular approach employed, such reductions in color depth, as realized at the encoding level by the streaming media server, can bring about enhancements in the performance of streaming video services; e.g., improvements in startup time, smoothness, and responsiveness of playback during a given streaming video session. Further, as the below-described selective color depth reduction processes diminish reliance on degradations to image resolution and/or video frame rate (attributes readily perceived and highly valued by many end users) through preferential reductions in color depth (an attribute typically less readily perceived or valued by end users), the overall end user viewing experience may be enhanced. An exemplary embodiment of a streaming media server suitable for carrying-out such selective color depth reduction processes will now be described in conjunction with FIG. 1.

Figure 1:
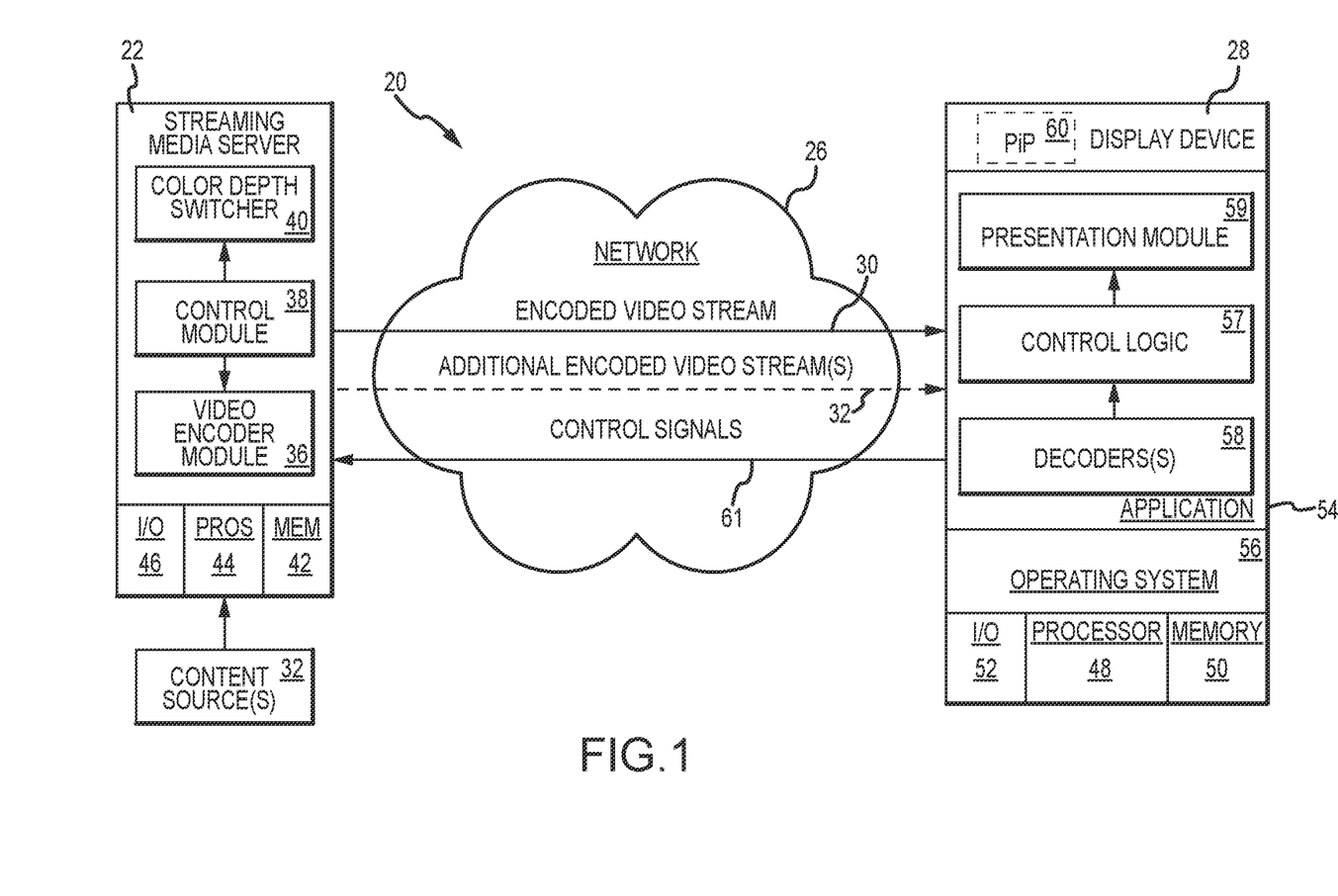
FIG. 1 is a schematic of a streaming media system including a client media receiver and streaming media server, which selectively reduces the color depth of video content transmitted to the receiver during a streaming video session, as illustrated in accordance with an exemplary embodiment of the present disclosure.

Examples of Systems Suitable for Applying Selective Color Depth Reduction of Streamed Video Content FIG. 1 schematically illustrates a streaming media system 20 including a streaming media server 22, which is suitable for applying controlled reductions in the color depth during a streaming video session established between server 22 and client media receiver 24. As depicted in FIG. 1, streaming media server 22 and, more broadly, streaming media system 20 are provided as generalized examples and should not be construed as limiting in any respect. In addition to streaming media server 22 and client media receiver 24, streaming media system 20 further includes a communications network 26 over which streaming video sessions are conducted. Communications network 26 may encompass any number of digital or other networks enabling communication between server 22 and receiver 24 utilizing common protocols and signaling schemes. In this regard, communications network 26 can include one or more open CDNs, VPNs, the Internet, and various other communications networks implemented in accordance with TCP/IP protocol architectures or other conventional protocols. Communications network 26 may also encompass one or more wired or LANs, WANs, a cellular network, and/or any other public or private networks.

During a given streaming video session, streaming media server 22 encodes, packetizes, and transmits streaming video content over communications network 26 to client media receiver 24. The streaming video content can and will often include accompanying audio content. As the content is received, client media receiver 24 decrypts (if needed) and decodes the streaming video content (also referred to herein as a "video stream" or a "media stream"). Client media receiver 24 utilizes the newly-decoded content to generate corresponding video output signals, which are forwarded to display device 28 for viewing by an end user operating receiver 24. The video output signals may be transmitted within a single electronic device or system when client media receiver 24 and display device 28 are combined as a unitary device, such as a smart phone, laptop computer, tablet computer, or wearable device. Alternatively, in embodiments in which device 28 is realized as an independent electronic device separate and apart from receiver 24, client media receiver 24 may output the video output signals as wired or wireless transmission, which are then supplied to display device 28.

In certain instances, streaming media server 22 may encode, packetize, and transmit a single video-containing media stream 30 during the streaming video session. In other instances, and as indicated in FIG. 1, streaming media server 22 may concurrently transmits multiple video-containing media streams 30, 32 as, for example, a streaming channel bundle provided pursuant to an OTT television service. Additional description in this regard is set-forth below, while noting (as indicated in FIG. 1 by depiction of arrow 32 in phantom line) that streaming media server 22 will often only transmit a single color depth-varied video or media stream during a given streaming video session. Regardless of the number of streaming channels or video streams provided by server 22 to receiver 24 during a given streaming video session, the streaming video content can be obtained from any number and type of content sources 34 in communication with or included within streaming media server 22. Content sources 34 can include, for example, content providers and aggregators external to streaming media server 22 and in communication with server 22 over communications network 26. Additionally or alternatively, content sources 34 can include any number and type of storage mediums accessible to streaming media server 22 (e.g., contained within or operably coupled to server 22) in which the video content subject to streaming is stored.

As appearing herein, the term "streaming media server" is defined broadly to encompass any device or group of operably-interconnected devices capable of encoding video content at selectively reduced color depths in the manner described herein. In the illustrated embodiment, specifically, streaming media server 22 includes at least one video encoder module 36, which operates under the command of at least one control module 38. Additionally, streaming media server 22 also includes at least one color depth modification module or "video color depth switcher module" 40. While generically illustrated as a separate module in FIG. 1, video color depth switcher module 40 can be combined with video encoder module 36 and/or control module 38 in certain implementations. Modules 36, 38, 40 can be implemented utilizing any combination of hardware and software (including firmware components. For example, modules 36, 38, 40 may be implemented utilizing software or firmware embodied by code or computer-readable instructions stored within memory 42 and executed by at least one processor 44, which is further included in server 22. As illustrated, memory 42 generally depicts the various storage areas or mediums contained in server 22 and may encompass any number and type of discrete memory sectors or types. In embodiments, processor 44 may be microprocessor, which is realized along with other non-illustrated components included in server 22 as a system-on-a-chip. Finally, it will be appreciated that server 22 may contain various other components know in the art including, for example, any number and type of I/O features 46 enabling bidirectional communication with client media receiver 24 and, perhaps, other nodes or devices over network 26.

Client media receiver 24 can assume various different forms including, but not limited, to mobile phones, wearable devices, tablets, laptop computers, desktop computers, gaming consoles, DVRs, and STBs. When engaged in a video streaming session with streaming media server 22, client media receiver 24 generates video signals for presentation on display device 28. Display device 28 can be integrated into client media receiver 24 as a unitary system or electronic device. This may be the case when receiver 24 assumes the form of a mobile phone, tablet, laptop computer, or similar electronic device having a dedicated display screen. Alternatively, display device 28 can assume the form of an independent device, such as a freestanding monitor or television set, which is connected to client media receiver 24, such as a gaming console, DVR, STB, or other peripheral device, utilizing a wired or wireless connection. In such embodiments, the video output signals may be formatted in accordance with conventionally-known standards, such as S-video, HDMI, SPDIF, DVI, or IEEE 1394 standards.

By way of non-limiting illustration, client media receiver 24 is shown in FIG. 1 as containing at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media receiver 24 may execute a software program or application 54 directing the hardware features of client media receiver 24 to perform the functions described herein. Application 54 suitably interfaces with processor 48, memory 50, and I/O features 52 via any conventional operating system 56 to provide such functionalities. Software application can be placeshifting application in embodiments wherein streaming media server 22 assumes the form of a STB, DVR, or similar electronic device having placeshifting capabilities and typically located within a user's residence. In some embodiments, client media receiver 24 may be implemented with special-purpose hardware or software, such as the SLING-CATCHER-brand products available from Sling Media Inc., currently headquartered in Foster City, Calif., and/or any other products.

Application 54 suitably includes control logic 57 adapted to process user input, receive video-containing media streams 30, 32 from server 22, decode the received media streams, and provide corresponding output signals to display device 28. Application 54 decodes content streams 30, 32 utilizing at least one decoding modules 58, whether implemented as specialized hardware or in software executing on processor 48. The decoded content is supplied presentation module 59, which generates corresponding output signals transmitted to display device 28. In certain embodiments, presentation module 59 may also combine decoded programming to create a blended or composite image; e.g., one or more PIP images 60 may be superimposed over a primary image generated on display device 28.

To establish a streaming video session, streaming media server 22 receives an initial transmission from client media receiver 24 via network 26. This initial transmission may include data identifying the content desirably streamed to client media receiver 24 and other information, such as data supporting authentication of streaming media server 22 and client media receiver 24. Additionally, in embodiments wherein streaming media server 22 assumes the form of a consumer placeshifting device, such as a STB or DVR located in the residence of an end user, control commands or signals 61 may include instructions to remotely operate the placeshifting device. During this process, video color depth switcher module 40 may selectively apply color depth reduction to the streamed video content under certain specified conditions, as will now be discussed more fully.

In embodiments, streaming media server 22 may automatically (that is, without requiring user input and, perhaps, regardless of network conditions) employ color depth reduction during an initial quick start phase of a streaming video session. Such an approach may be particularly useful when, for example, streaming media server 22 functions as a placeshifting device, which streams user-selected media content as the content is read or played from a computer-readable storage medium included in or coupled to server 22. For example, when server 22 assumes the form of an STB or other device having DVR capabilities, streaming media server 22 may placeshift video content previously recorded into an internal memory (e.g., memory 42) as a streaming transmission to client media receiver 24 for viewing on display device 28. In this case, streaming media server 22 may capture, encode, encrypt (if desired), and transmit segments of video content to support a placeshifting session; while client media receiver 24 receives, decodes, and decrypts (if needed) the streamed content for presentation on display device 28.

Streaming media server 22 may initially encode any video content selected for placeshifting at a reduced or shallowed color depth under certain specified conditions. For example, streaming media server 22 may automatically apply color depth reduction during an initial "quick start" phase of a streaming video session. In such embodiments, streaming media server 22 may encoded the video stream to have a reduced color depth for an initial phase of the streaming video session having a duration $D_1$. After elapse of duration $D_1$, server 22 may then transition to generation of the encoded video stream at a color depth substantially equivalent to the original color depth. Duration $D_1$ may be assigned a static value on the order of, for example a few seconds. Alternatively, duration $D_1$ may have a dynamic value, which is adjusted as a function of network bandwidth, latency, or another parameter monitored by server 22; e.g., utilizing bandwidth monitor 62 described below in conjunction with FIG. 2. By automatically applying color depth reduction at the outset of such a placeshifting session, streaming media server 22 can provide client media receiver 24 with the user-selected placeshifted content in a highly responsive, low lag manner. In other embodiments, color reduction may be employed to support such an initial "quick start" phase, while streaming media server 22 transmits streaming video content other than placeshifted content (e.g., VOD content) during a given streaming video session.

In implementations in which server 22 transmits multiple streaming channels to client media receiver 24 as, for example, an OTT television channel bundle, streaming media server 22 may selective apply color reduction to one or more of the channels contained in the channel bundle. In one approach, streaming media server 22 may determine whether a particular channel in the OTT television channel bundle is currently being viewed by an end user; e.g., as based upon data received from client media receiver 24 as control signals 61. Streaming media server 22 may then encode the particular streaming channel at an original color depth if the streaming channel is currently viewed by an end user operating client media receiver 24. Conversely, streaming media server 22 may encode the particular streaming channel at a reduced color depth if the streaming channel is not currently viewed by the end user operating receiver 24. This process may be applied to all the streaming channels contained in the OTT television bundle such that many, if not all of the streaming channels not presently viewed by an end user are encoded and transmitted at reduced color depths.

In the above-described manner, selective color depth reduction can be applied by streaming media server 22 to reduce the streaming bitrate of an OTT television channel bundle, which may contain a relatively large number of channels. Further, as many, if not all of the streaming channels contained in the OTT television channel bundle are concurrently streamed to client media receiver 24 by server 22, little to no delay is encountered as a user changes between streaming channels. When selecting a new streaming channel for viewing, corresponding data is provided from client media receiver 24 to streaming media server 22, which may then transition to encoding the newly-selected streaming channel in its full or original color depth. A similar approach may also be employed for image resolutions and/or video frame rates at which server 22 encodes the various streaming channels contained in the channel bundle, if so desired.

In still further implementations, streaming media server 22 may selectively reduce or shallow the color depth of streamed video content in response to variations in one or more parameters pertaining to communications network 26, such as changes in network bandwidth. As a specific example, streaming media server 22 may be to selectively apply color reduction as network bandwidth constraints fluctuate from slightly restricted to moderately restricted levels, with little to no degradation to the image resolution and/or video frame rate of the streamed video content. In other instances, such as when relatively severe network bandwidth constraints arise, server 22 may instead generate the encoded video stream to a have a reduced color depth, as well as a reduced image resolution and/or video frame rate. If desired, a hierarchy can be implemented in which color depth is first reduced, followed by frame rate, and finally image resolution, as required to satisfy one or more target parameters, such variable streaming bitrate targets. Additional description of systems and methods for implementing such a streaming bitrate reduction hierarchy will now be described in conjunction with FIGS. 2-3.

Figure 2:
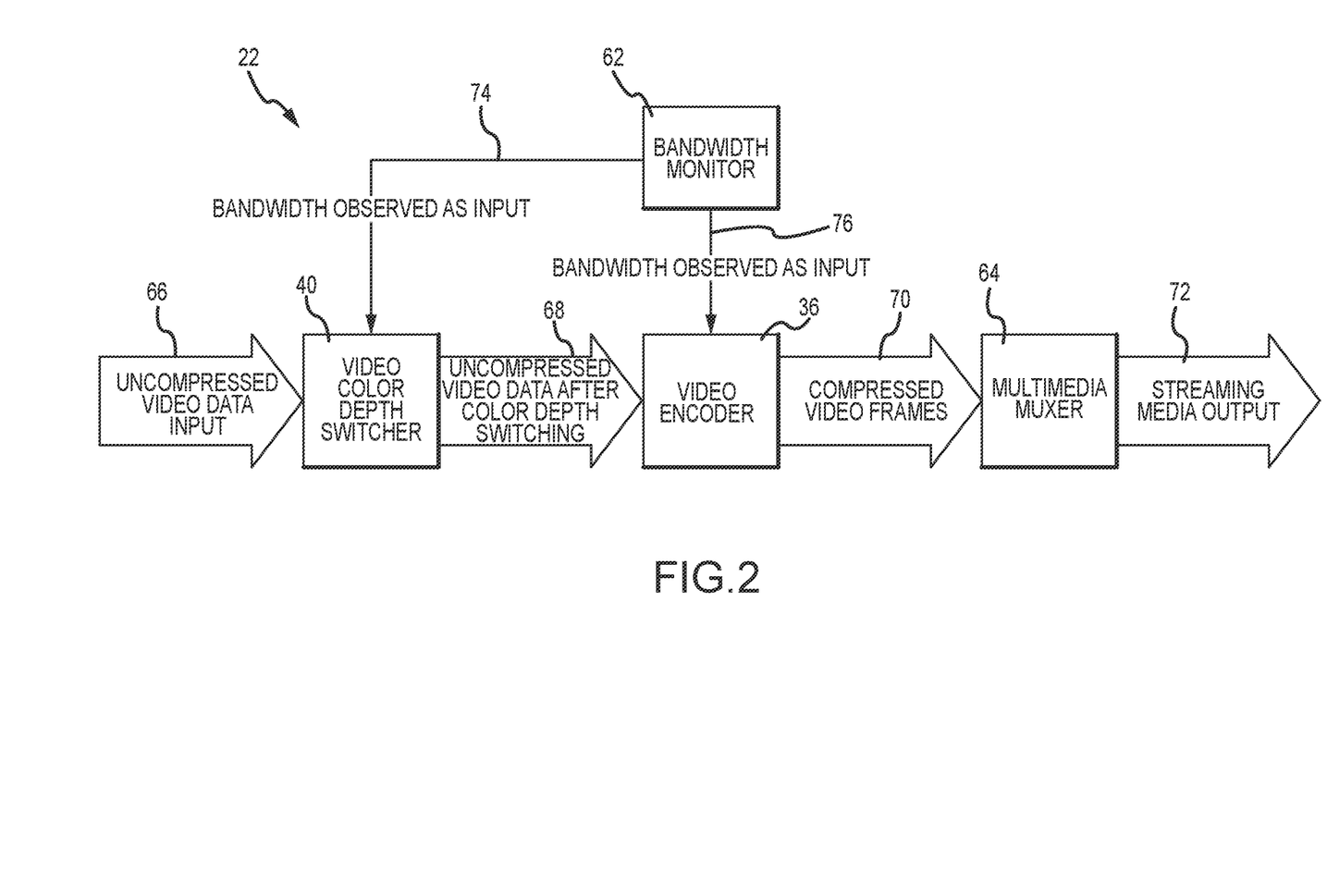
FIG. 2 is a diagram illustrating an exemplary architecture suitably included in the streaming media server shown in FIG. 1 in implementations in which the server selectively reduces the color depth of streaming video as a function of variations in network bandwidth.

Examples of Processes for Selective Color Depth Reduction of Streamed Video Content FIG. 2 is a diagram illustrating an exemplary manner in which streaming media server 22 may be functionally implemented when, for example, server 22 applies color depth variance in response to variations in a current bandwidth of communications network 26. Reference numerals are carried-over from FIG. 1 to FIG. 2, where appropriate. Additionally, in the more specific example of FIG. 2, streaming media server 22 further includes a bandwidth monitoring module or "bandwidth monitor" 62, which is operatively coupled to an input of video encoder module 36; and a multiplexer module 64, which is operatively coupled to an output of video encoder module 36. Control module 38 is not shown in FIG. 2, but may be operatively coupled to or encompass bandwidth module 62. Additionally, and as previously indicated, modules 36, 40, 62, 64 can be implemented utilizing any combination of hardware, software, and firmware; and may be combined as hardware or software in certain instances, but are depicted as separate blocks in FIG. 2 for illustrative clarity.

Data flow is indicated in FIG. 2 by a series of arrows 66, 68, 70, 72. Arrow 66 represents video input data, which is received in a source form (a raw or uncompressed form) at an input of video color depth switcher module 40. The video input data can be obtained from various content sources, such as content sources 34 described above in conjunction with FIG. 1. The uncompressed video input data contains the desired video content in a source format having original (native or nondegraded) characteristics including an original color depth. When appropriate, video color depth switcher module 40 processes the video input data to apply color depth reduction, and then forwards the resulting variable color depth video data (to which color depth reduction may or may not be applied at any given time) to video encoder module 36. as indicated in FIG. 2 by arrow 68. As module 36 receives the variable color depth video data, video encoder module 36 encodes the received video input data at desired encoding parameters to generate compressed video frame data 70, which is supplied to multiplexer module 64. Multiplexer module 64 combines the compressed video signals with any additional streams, such as an accompanying audio signal stream; packetizes the streaming media output (including the encoded data stream); and transmits the resulting video-containing media stream through network 26 to client media receiver 24, as indicated by arrow 72.

Video color depth switcher module 40 can selectively reduce the color depth of uncompressed video output 68 in response to any number of conditions or monitored parameters. In the example of FIG. 2, specifically, video color depth switcher module 40 receives a bandwidth input signal 74 from bandwidth monitor 62 indicative of a current bandwidth of communications network 26. Video color depth switcher module 40 applies color depth reduction as a function of the current network bandwidth indicated by signal 74. In certain cases, module 40 may increase the intensity of color depth reduction as network bandwidth becomes increasingly constrained utilizing a graded or tiered approach. Video encoder module 36 may likewise receive bandwidth input signal 76 from bandwidth monitor 62; and, in certain embodiments, may vary the image resolution, video frame rate, and/or other parameters to which compressed video frames 70 are encoded in response to changes in the current bandwidth of network 26. Modules 36, 40 advantageously cooperate to provide a hierarchical approach in bitrate reduction, which favors in reduction color depth over reductions in image resolution and frame rate, in at least some embodiments. In this manner, image resolution and video frame rate may be preserved at high levels, to the extent possible, as network bandwidth limitations arise. An exemplary embodiment of such a hierarchical bitrate reduction approach will now be described in conjunction with FIG. 3.

Figure 3:
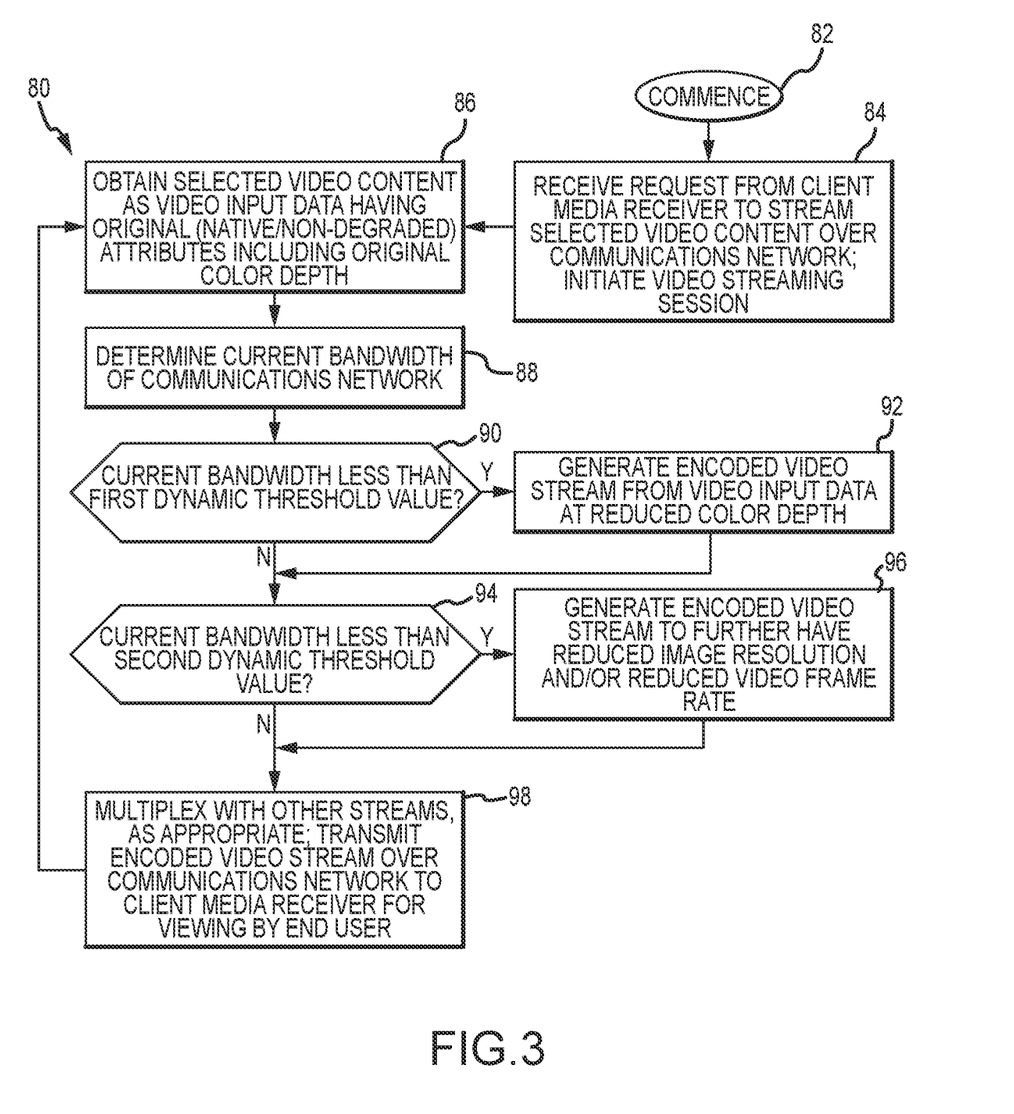
FIG. 3 is a flowchart of a selective color depth shallowing process carried-out by the streaming media server of FIGS. 1-2 to selectively reduce the color depth of streaming video in response to variations in network bandwidth, as further illustrated in accordance with an exemplary embodiment of the present disclosure.

FIG. 3 is a flowchart setting-forth a selective color depth reduction process 80, as illustrated in accordance with an exemplary embodiment of the present disclosure. Selective color depth reduction process 80 is usefully performed by streaming media server 22 (FIGS. 1-2) to selectively reduce the color depth of streamed video content during a given streaming video session. As generically depicted in FIG. 3, selective color depth reduction process 80 includes a number of processes or steps, which are identified as STEPS 82, 84, 86, 88, 90, 92, 94, 96, 98. These steps are each discussed, in turn, below. As shown in FIG. 3 and described below, selective color depth reduction process 80 is presented by way of non-limiting example only and with the noted caveat that additional steps may be performed, certain steps may be omitted, or the sequence of steps may vary in alternative embodiments of selective color depth reduction process 80.

Upon commencement of process 80 (STEP 82), streaming media server 22 receives a request from client media receiver 24 (FIGS. 1-2) to initiate a streaming video session over communications network 26 (STEP 84, FIG. 3). In response to receipt of this request, streaming media server 22 (FIGS. 1-2) obtains the selected video-containing content for transmission to client media receiver 24 during the ensuing streaming video session (STEP 86, FIG. 3). As previously described, streaming media server 22 may obtain the selected video content as video input data having an original color depth, image resolution, and video frame rate (again, indicated in FIG. 2 by uncompressed video input data 66). The video content can be obtained from any one of content sources 34 described above in conjunction with FIG. 1; from a memory included within or otherwise accessible to streaming media server 22 when assuming the form of a DVR, STB, or other consumer electronic device having placeshifting capabilities; or from any other source capable of providing the desired video content.

Next, at STEP 88 of selective color depth reduction process 80, streaming media server 22 determines the current available bandwidth of communications network 26 utilizing bandwidth monitor 62 (FIG. 2). Bandwidth monitor 62 and, more generally, streaming media server 22 may monitor any parameter or combination of parameters to determine current network bandwidth. Streaming media server 22 may then compare the current network bandwidth to a first dynamic or adjustable threshold value. This threshold value may be calculated and recalculated by streaming media server 22 in a dynamic or "on-the-fly" manner immediately prior to performing STEP 92 during each iteration of process 80. If the network bandwidth is less than the first dynamic threshold value, selective color depth reduction process 80 progresses to STEP 92. During STEP 92, streaming media server 22 (e.g., video color depth switcher module 40 shown in FIG. 2) applies the desired color depth reduction in generating the encoded video stream. Examples of techniques that can be employed by streaming media server 22 in reducing the color depth of the video content during STEP 92 of process 80 are set-forth below.

If, at STEP 90 of process 80 (FIG. 3), it is instead determined that the present bandwidth of communications network 26 (FIG. 1) exceeds the first dynamic threshold value, streaming media server 22 progresses directly to STEP 94 of selective color depth reduction process 80. During STEP 94, streaming media server 22 further determines whether the network bandwidth exceeds a second dynamic threshold value. In a manner similar to the first dynamic threshold value, the second dynamic threshold value can be calculated and adjusted, as needed, by server 22. If the network bandwidth is less than the second dynamic threshold value, streaming media server 22 further processes the video content to reduce the frame rate and/or image resolution thereof (STEP 96, FIG. 3). In certain embodiments, the second dynamic threshold value is greater or less restrictive than the first dynamic threshold value such that reductions in video frame rate and/or image resolution are prioritized over reductions in color depth. It will often be the case, however, that the second dynamic threshold value will be less or more restrictive than the first dynamic threshold value to preferentially apply reductions in color depth over reductions in video frame rate and/or image resolution to achieve the benefits described herein.

Lastly, at STEP 98 of selective color depth reduction process 80 (FIG. 3), streaming media server 22 combines the video media stream with other component streams, such as an audio stream, as appropriate. Streaming media server 22 subsequently transmits the combined streams to client media receiver 24 for presentation on display device 28 and end user viewing. Afterwards, streaming media server 22 returns to STEP 86 of process 80. STEPS 86, 88, 90, 92, 94, 96, 98 of selective color depth reduction process 80 thus loop until the current video streaming session is terminated. In this manner, streaming media server 22 continually or repeatedly encodes, packetizes, and transmits the desired video-containing media stream, while selectively applying color depth reduction to bring about desired reductions in streaming bitrate. Several examples of approaches for generating an encoded video stream to have a reduced or shallowed color depth, as may be employed by streaming media server 22 when carrying-out STEP 92 of process 80 as described above, will now be discussed in greater detail.

Examples of Selective Color Depth Reduction Techniques

Various different techniques can be employed by streaming media server 22 and, more specifically, video color depth switcher module 40 (FIGS. 1-2) to bring about desired reductions in the color depth of video content. In certain embodiments, controlled reductions in the color depth can be achieved by encoding streamed video content utilizing a restricted color palette. As appearing herein, the term "color palette" is defined as the number of discrete color values available for usage in encoding the video frame images. In certain embodiments, color depth reduction can be achieved by encoding the video content with a monochrome color palette, such as a black-and-white palette. In other embodiments, the compressed video frames may be rendered utilizing a grayscale palette, such as 2-bit, 4-bit, or 16-bit grayscale palette, when color depth reduction is applied. As a still further possibility, an encoded video stream may be imparted with a reduced color depth by encoding the video input data utilizing a color palette having a color range spanning the visible spectrum, but containing a diminished number of discrete color values as compared to the original color depth of the video input data, such as uncompressed video input data 66 shown in FIG. 2. Any or all of the aforementioned color palettes can be utilized and, perhaps, actively switched between by server 22 depending upon the reductions in streaming bitrate desirably achieved at a given juncture during the video streaming session.

In addition to or in lieu of the usage of a restricted color palette, desired reductions in color depth can be achieved by generating the encoded video stream at reduced color resolutions. The term "color resolution," as appearing herein, is defined as the number of regions contained in given video frame image, which are assigned discrete color values. When the color depth of streaming video content is reduced or shallowed in this manner, streaming media server may implement the desired color depth reduction by generating the encoded video stream to have reduced color resolution as compared to the original (native or nondegraded) color resolution of the video input data. For example, if the video input data specifies a unique color value for each pixel included in a video frame, streaming media server 22 may reduce the color depth of the encoded video stream by assigning color values to larger groups of pixels, rather than reproducing the color values on a pixel-by-pixel basis. As a more specific approach, streaming media server 22 may determine a particular color value for a groups of contiguous pixels (e.g., 2×2, 4×4, or 8×8 pixel blocks) rather than any single pixel. In such embodiments, server 22 may determine the approximate color value to assign to a given pixel group or block by, for example, blending or averaging the color values of the individual pixels within the pixel group.

In still further implementations, streaming media server 22 may obtain the video input data in a format containing chroma and luma information or, perhaps, may convert the video input data to such a format. In such implementations, color depth reduction can be achieved by generating the encoded video content to include the luma information and to omit (or degrade) the chroma information. For example, and referring jointly to FIGS. 2-3, video input data 66 may contain chroma and luma components in its native, uncompressed form or, instead, may be converted to chroma and luma components by video color depth switcher module 40. The chroma and luma information can include, for example, a luma component (Y) defining pixel luminance, a first chroma component ($C_B$) defining a blue-difference chroma component, and a second chroma component ($C_R$) defining a red-difference chroma component. When color depth reduction of the streaming video content is desired, the chroma component information may be wholly stripped by video color depth switcher module 40 (or, more generally, streaming media server 22) when generating compressed video frames 70. Thus, in such embodiments, compressed video frames 70 may only include luma component (Y) defining pixel luminance resulting in grayscale video. Alternatively, the chroma component information may not be wholly stripped by video color depth switcher module 40, but rather converted to a less fine (coarsened) color range by conversion to lower bit count value to achieve the desired streaming bitrate reduction.

Still other color depth reductions techniques can be utilized in lieu of or in combination with the techniques just described. Additionally, in certain cases, video color depth switcher module 40 or, more generally, streaming media server 22 may reduce the color depth of streaming video content by interleaving or interspersing video frames having a reduced color depth with video frames having the original (native or nondegraded) color depth. As a specific example, video encoder module 36 may insert full color frame after a predetermined number of successive frames having reduced color depths; e.g., a full color frame may be inserted after a series of two to five frames rendered in grayscale. Such an approach may create the impression, as imparted an end user viewing the streaming video content, that the color depth of the streaming video content is somewhat muted or dulled, but only to a limited extent. Various other image processing techniques may also be employed in conjunction with the above-described selective color reduction technique; e.g., dithering may be optionally applied by video color depth switcher module 40 and/or video encoder module 36, as appropriate, to improve perceived image quality of the streamed video content when color depth reduction is applied thereto.

Conclusion

There has thus been provided systems and methods for selectively decreasing or shallowing the color depth of streaming video content to bring about controlled reductions in streaming bitrate. By virtue of the above-described controlled reductions in the color depth approaches, various measures of streaming performance can be enhanced. Such measures of streaming performance may include improvements in the startup time, smoothness, and responsiveness of playback during a given streaming video session. In certain embodiments, color reduction may be employed as a matter of course during a predetermined phase, such as an initial quick start phase, of a streaming video session. In other implementations, color reduction can be performed when encoding secondary streaming channels (streaming channels not presently viewed) transmitted in conjunction with a primary streaming content encoded at its original (native or full) color depth, as may be particularly useful when streaming OTT television content. In still further implementations, selective color depth reduction can be applied and varied in response to variations in one or more monitored parameters, such as network bandwidth. In each of the cases above, controlled reductions in the color depth can be employed as a standalone solution in reducing streaming bitrate or, instead, in conjunction with controlled reductions to other measures of streaming video quality, such as controlled degradations to image resolution and/or video frame rate.

While multiple embodiments of been described above in which a server (e.g., server 22 shown in FIGS. 1-2) applies color depth reduction under certain specified conditions in a reactive manner, it will be appreciated that the streaming media server can also apply color depth reduction in a proactive manner in further implementations. In this regard, embodiments of the streaming media server may carry-out a method or process during which the server generates a plurality of video streams of varying bandwidths from the above-described video input data. The plurality of video streams can include, for example, a high bandwidth media stream containing the video content encoded at an original color depth and at an original image resolution (or frame rate), an intermediate bandwidth media stream containing the video content encoded at a reduced color depth and at the original image resolution (or frame rate), and a low bandwidth media stream containing the video input data encoded at the reduced color depth color depth and at a reduced image resolution (or frame rate). Other video streams of varying bandwidths can also be generated, as desired. The streaming media server may then avail the client media receiver (e.g., receiver 24 shown in FIG. 1) of the high, intermediate, and low bandwidth media streams through a communications network. When decoding and presenting the video content to an end user, the client media receiver may then actively switch between the video streams of varying bandwidths as appropriate to, for example, best suit current playback conditions.

The term "exemplary" is used herein to represent one example, instance or illustration that may have any number of alternates. Any implementation described herein as "exemplary" should not be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method performed by a streaming media server, the method comprising:
   receiving, at the streaming media server, a request transmitted over a communications network to stream video content to a client media receiver; and
   in response to the request, initiating a streaming video session with the client media receiver by:
      obtaining the video content as video input data having an original color depth;
      generating an encoded video stream from the video input data to include luma information;
      during an initial phase of the streaming video session, generating the encoded video stream with limited color palettes-and degraded chroma information to thereby selective reduce the color depth of the encoded video stream relative to the original color depth, wherein the limited color palette is based upon an averaging of color values to produce a hierarchical bitrate reduction favoring reductions of color depth over reductions in image resolution and frame rate;
      after the initial phase of the streaming video session, generating the encoded video stream without the limited color palettes and without the degraded chroma information to thereby produce a restored color depth that is substantially equivalent to the original color depth; and
      transmitting the encoded video stream over the communication network to the client media receiver.

2. The method of claim 1, further comprising:
in response to use of restricted color palettes, implementing a limited color palette by blending a plurality of color values in applying a color depth reduction.

3. The method of claim 1 further comprising:
monitoring, at the streaming media server, a current bandwidth of the communications network; and
when generating the encoded video stream, determining approximate color values based on a set of blended color values to assign for groups of contiguous pixels when applying color depth reduction with a limited color palette of the encoded video stream.

4. The method of claim 3 further comprising, when generating the encoded video stream, varying the color depth of the encoded video stream with limited color palettes to impart the encoded video stream with:
chroma component information wholly stripped by a video color depth switcher module when generating compressed video frames in the encoded video stream wherein the compressed video frames comprise luma component (Y) to define a pixel luminance resulting in a grayscale video stream.

5. The method of claim 4, further comprising, when generating the encoded video stream, varying the color depth with limited color palettes of the encoded video stream to impart the encoded video stream with:
a chromo component information which is not wholly stripped in its entirety by the video color depth switcher module and is converted to a less fine color range by a conversion to a lower bit count value to achieve a desired streaming bitrate reduction.

6. The method of claim 1 further comprising:
reducing a color depth of streaming video content by interspersing video frames having a reduced color depth with limited color palettes with video frames having a nondegraded color depth.

7. The method of claim 1, further comprising:
determining approximate color values for assigning to groups of contiguous pixels rather than any single pixel.

8. The method of claim 1 further comprising:
rendering compressed video frames by utilizing a grayscale palette comprising a 2-bit, a 4-bit, or a 16-bit grayscale palette, when a color depth reduction with restricted color palettes is applied.

9. The method of claim 8, further comprising:
wherein the video input data is generated utilizing an original color palate;
wherein the method further comprises, when reducing the color depth of the encoded video stream, encoding the video input data utilizing a restricted color palette containing a reduced number of color values relative to that contained in the original color palate; and
wherein the encoded video stream is imparted with a reduced color depth by encoding the video input data utilizing a color palette having a color range spanning a visible spectrum, and containing a diminished number of discrete color values as compared to the original color depth of the video input data.

10. The method of claim 1 wherein the video input data further has an original color resolution; and
wherein the method further comprises, when reducing the color depth with a restricted color palette of the encoded video stream, encoded video stream, encoding the video input data to have a reduced color resolution based on the reduced color palette relative to the original color resolution.

11. The method of claim 1 further comprising, when reducing the color depth of the encoded video stream, encoding the video input data to contain (i) video frames having the original color depth and (ii) video frames having a reduced color depth with a restricted color palette which are interleaved with the video frames having the original color depth.

12. A streaming media server configured to initiate a streaming video session with a client media receiver over a communications network, the streaming media server comprising:
a processor; and
a computer-readable storage medium storing a computer-executable code that, when executed by the processor, causes the streaming media server to perform the operations comprising:
when receiving a request from the client media receiver for streaming transmission of video content over the communications network, obtaining the video content as video input data having an original color depth;
generating an encoded video stream from the video input data;
wherein, during an initial phase of the streaming video session, the encoded video stream is generated with limited color palettes and degraded chroma information to thereby selective reduce the color depth of the encoded video stream relative to the original color depth, wherein the limited color palette is based upon an averaging of color values to produce a hierarchical bitrate reduction favoring reductions of color depth over reductions in image resolution and frame rate, and wherein after the initial phase of the streaming video session, the encoded video stream is generated without the limited color palettes and without the degraded chroma information to thereby produce a restored color depth that is substantially equivalent to the original color depth, and wherein the limited color palette is based upon an averaging of color values to produce a hierarchical bitrate reduction favoring reductions of color depth over reductions in image resolution and frame rate;
transmitting the encoded video stream configured with a restricted color number over the communications network to the client media receiver; and
repeating the steps of generating and transmitting until termination of the streaming video session.

13. The streaming media server of claim 12 wherein the streaming media server comprises:
a bandwidth monitor module configured to monitor a current bandwidth of the communications network; and
a video color depth switcher module operably coupled to the bandwidth monitor module, the video color depth switcher module configured to receive the video input data and selectively reduce the color depth with a restricted color palette thereof in response to variations in the current bandwidth of the communications network, as detected by a bandwidth monitor.

14. The streaming media server of claim 13 further comprising a video encoder module operably coupled to the video color depth switcher module, the video encoder module configured to:
receive, from the video color depth switcher module, the video content in an uncompressed form; and
generate, as an output, the video content in an encoded format containing compressed video frames.

15. The streaming media server of claim 12 further comprising a server memory coupled to the processor and storing the video content;
  wherein, when executing the computer-executable code, the streaming media server provides the video content to the client media receiver as placeshifted video content, which is played from the server memory, captured, encoded, and transmitted to the client media receiver during the streaming video session.

16. The streaming media server of claim 12 wherein, when executing the computer-executable code, the streaming media server:
  monitors a current bandwidth of the communications network; and
  generates the encoded video stream to have:
    a color depth substantially equivalent to the original color depth when the current bandwidth is equal to or greater than a first threshold value; and
    a reduced color depth with a restricted color palette when the current bandwidth decreases below a first threshold value.

17. The streaming media server of claim 12 wherein, when executing the computer-executable code, the streaming media server generates the encoded video stream to have:
  an image resolution substantially equivalent to an original image resolution of the video input data when the current bandwidth is equal to or greater than a second threshold value less than the first threshold value; and
  a reduced image resolution and a reduced color depth with a restricted color palette when the current bandwidth decreases below the second threshold value.

* * * * *